Oct. 10, 1967     D. B. ROESNER     3,346,400
TRAY
Filed Feb. 8, 1965
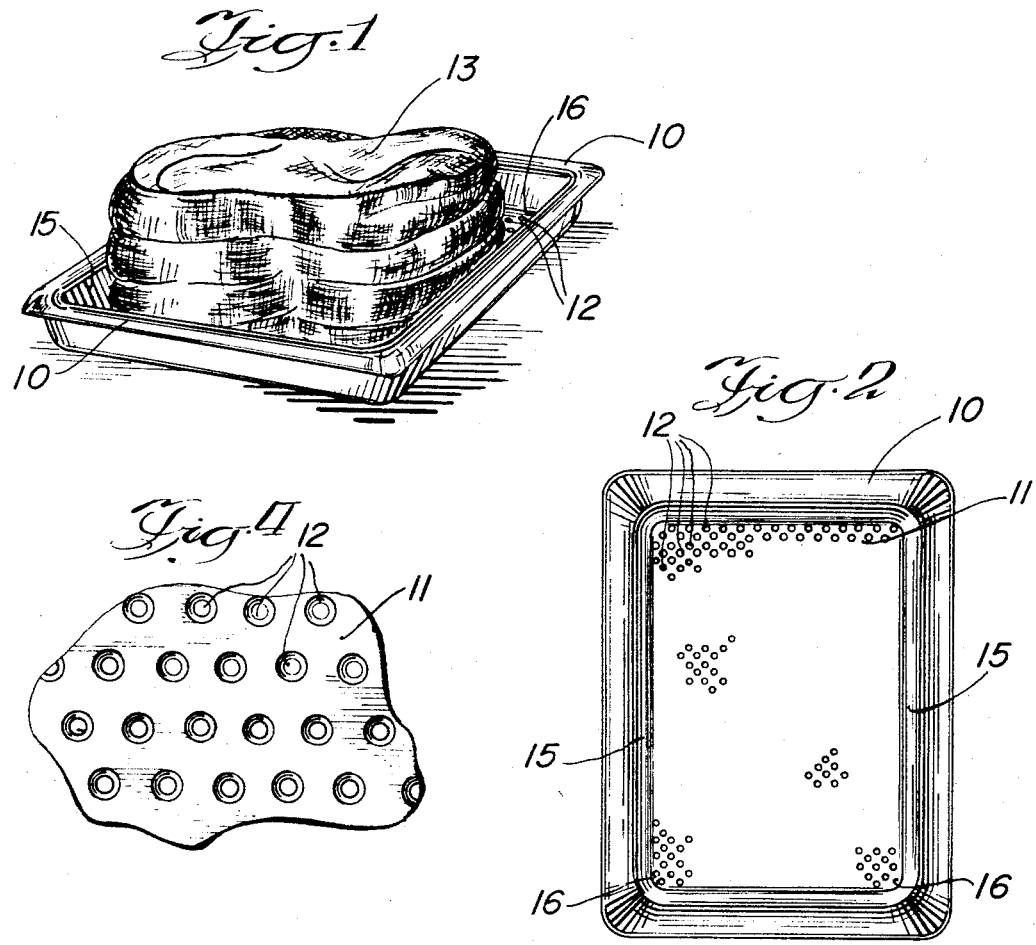
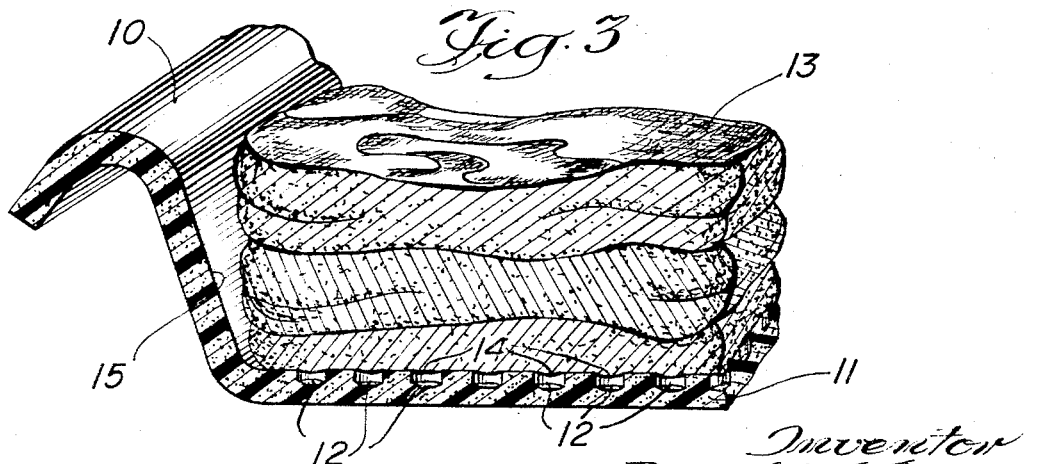

3,346,400
TRAY
Donald B. Roesner, Chicago, Ill., assignor to American Excelsior Corporation, a corporation of Delaware
Filed Feb. 8, 1965, Ser. No. 430,895
5 Claims. (Cl. 99—174)

This invention relates to a shaped plastic receptacle such as a tray for holding a food product such as meat which is susceptible to deterioration in the absence of air contact.

Certain moisture containing food materials and products such as meat are often held or displayed in receptacles such as trays. In the ordinary smooth surface receptacle the product is out of contact with air on that portion in contact with the smooth surface. As a result, the food product often deteriorates such as by becoming discolored or even spoiling.

Thus, meat in contact with a smooth surface and out of contact with air will in a relatively short time turn dark colored or blackish in color after remaining in contact with the receptacle without any air present. This problem is so severe that often supermarkets or the like displaying meat in trays must remove the feat from each tray at the end of the day and then at the beginning of the next day place it back in the tray. This permits air contact during the night so that the meat will not become discolored.

Another disadvantage is that moisture containing food products stored or displayed in receptacles or trays lose liquid which is primarily water which flows to the edge of the receptacle beyond the extremities of the product. This is often unslightly and repelling to possible customers, particularly in the case of meat where after a relatively short storage period bloody colored water tends to gather at the edges and the corners of the bottom of the receptacle or tray.

One of the features of this invention is to provide a shaped plastic receptacle for holding a food product susceptible to deterioration in the absence of air contact to provide this air contact and thereby prevent the deterioration.

Another feature of the invention is to provide such a receptacle in the form of a tray having means forming a liquid proof product supporting bottom as a part of the tray and means forming a plurality of separated air containing and liquid entrapping wells in the bottom, each open at the end adjacent the food product and having an inner end spaced from the product with the result that each well provides a body air in contact with the food product and also serves as a receiver for holding pockets of liquid from the food product.

Other features and advantages of the invention will be apparent from the following description of one embodiment as disclosed in the accompanying drawings. Of the drawings:

FIGURE 1 is a perspective view of a tray embodying the invention and displaying a portion of raw meat.

FIGURE 2 is a plan view of the tray itself.

FIGURE 3 is a sectional perspective view illustrating the relationship of the tray to the food product such as meat held therein.

FIGURE 4 is a fragmentary enlarged plan view of a portion of the bottom of the tray.

The receptacles of this invention of which the tray 10 is an example are constructed of a shaped plastic material. This may be any of the well known materials that are inert to the food product stored in the receptacle of which polyvinyl plastics, polystyrene, polyurethane and the like are examples only. This plastic material is preferably cellular, containing closed cells, primarily because of lightness, inexpensiveness and strength.

The supporting surface 11 of the receptacle which in the illustrated embodiment is the bottom contains spaced separated indentations forming wells 12. These wells as is illustrated in FIGURE 3 each contain air so as to form separated air pockets in contact with the food product being stored such as the meat 13. Each of these small pockets is open at the end adjacent the food product so that a section 14 of the product surface in contact with the receptacle surface 11 extends across the top of the pocket. Each pocket is of such depth that this spanning portion of the product does not touch the bottom of the pocket.

The plurality of pockets 12 in the supporting surface 11 are out of communication with each other so as to form isolated masses of air in contact with the product 13. In addition, the separated pockets 12 serve as traps to collect any liquid given off by the food product with the result that this liquid does not tend to flow toward the sides 15 or collect in the corners 16. This is of extreme importance in the case of food products containing high proportions of liquid, such as meat, as it keeps the liquid out of sight. This is of extreme importance, again in the case of meat, because after a few hours of storage time the meat tends to give off a bloody colored watery liquid so that the display sometimes is repelling to the prospective customer.

The wells 12 are shown in the illustrated embodiment as being generally cylindrical. They may of course be of any shaped desired including oval, elongate, diamond shape, rectangular or the like. In the preferred construction each well 12, whatever its shape, is about $1/16$–$3/8$ inch in its shortest transverse dimension with an ideal dimension being about $1/8$ inch. Each well is preferably about $1/16$–$3/8$ inch deep with one example being again $1/8$ inch. The wells are separated from each other but closely spaced so that air and liquid cannot flow from one well to the other. An ideal spacing has been found to be about $1/16$–$3/8$ inch with one excellent example being $1/8$ inch.

The shortest transverse dimension range of $1/16$–$3/8$ inch given above is merely exemplary of a practical range. Actually, the preferred transverse dimension is such that the wells will not materially emboss or impart a design to the surface of the meat or other food product in contact with this surface.

By constructing the receptacle of this invention of a plastic material and preferably an expanded plastic material such as expanded polystyrene the receptacles are easily produced in large quantities by a customary molding operation. In such instances the die that shapes the interior of the receptacle may be provided with embossing sections so as to provide the plurality of spaced wells in the manufacturing operation. An example of a tray such as the type illustrated is one made of expanded polystyrene sheet about 60 mils thick with the wells each being about 40 mils deep and $1/8$ inch in diameter. These wells were about $1/8$ inch apart. Thus, the wells in this embodiment would extend into the bottom of the tray about two-thirds of the thickness of the tray.

When used for storing a food product such as meat, the meat in effect forms a lid over each well 12 as illustrated in FIGURE 3 to keep the air within the well and prevents its escaping. As such stored food product, such as meat, is continually respiring, this air in contact with the food product preserves a fresh appearance even in that portion of the food product contacting the supporting surface.

Although the receptacle of this invention has been found especially useful for displaying fresh meat, it has also been found useful in packaging fruit and vegetables and fish and the like, where air contact is necessary to retard or prevent spoilage.

Having described my invention as related to the embodiment shown in the accompanying drawings, it is my intention that the invention be not limited by any of the details of description, unless otherwise specified, but rather be construed broadly within its spirit and scope as set out in the accompanying claims.

I claim:

1. A plastic receptacle for holding a moisture containing food product such as meat susceptible to deterioration in the absence of air and moisture contact, comprising: means forming a liquid proof product supporting surface in said receptacle; and means forming a plurality of separate, individually distinct, liquid proof wells in said supporting surface, each well having a closed inner end spaced from said product, and each well having a single access opening at the upper end adjacent said product adapted to be sealed over by said product to entrap liquid and air in the individual wells when the product is on said supporting surface and extending across said wells.

2. The receptacle of claim 1 wherein said receptacle is a tray and each said well is about $1/16$–$3/8$ inch in its shortest transverse dimension, is about $1/16$–$3/8$ inch deep but less than the thicknes of said bottom, and said wells are spaced apart about $1/16$–$3/8$ inch.

3. A packaged food product, comprising: a plastic receptacle having means forming a liquid proof supporting surface in said receptacle having a plurality of separate, individually distinct, liquid proof wells in said supporting surface; and a moisture containing food product on said supporting surface of said receptacle and extending across said wells, each well having a closed inner end spaced from said product, and each well having a single access opening at the upper end adjacent said product and sealed over by said product to entrap liquid and air in the individual wells.

4. The packaged food product of claim 3 wherein said food product is meat.

5. The packaged food product of claim 3 wherein said receptacle is a tray having a bottom comprising said supporting surface and constructed of a closed cell cellular plastic, and each well is about $1/16$–$3/8$ inch in its shortest transverse dimension, is about $1/16$–$3/8$ inch deep but less then the thickness of said bottom, and said wells are spaced apart about $1/16$–$3/8$ inch.

References Cited

UNITED STATES PATENTS

| | | | |
|---|---|---|---|
| 2,893,877 | 7/1959 | Nickolls | 99—174 |
| 2,917,217 | 12/1959 | Sisson. | |
| 3,026,209 | 3/1962 | Niblack et al. | 99—174 |
| 3,040,947 | 6/1962 | Wells et al. | 229—2.5 |
| 3,040,948 | 6/1962 | Wells | 229—2.5 |
| 3,040,949 | 6/1962 | Foote | 229—2.5 |
| 3,155,303 | 11/1964 | Fenkel | 229—2.5 |
| 3,189,243 | 6/1965 | Lux. | |
| 3,264,120 | 8/1966 | Westcott. | |

FOREIGN PATENTS 864,039   3/1961   Great Britain.

DAVIS T. MOORHEAD, *Primary Examiner.*

JOSEPH R. LECLAIR, *Examiner.*